US008351085B2

(12) United States Patent
Wang et al.

(10) Patent No.: US 8,351,085 B2
(45) Date of Patent: Jan. 8, 2013

(54) MOIRE-FREE COLOR HALFTONING METHODS, APPARATUS AND SYSTEMS

(75) Inventors: Shen-ge Wang, Fairport, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 595 days.

(21) Appl. No.: 12/539,925

(22) Filed: Aug. 12, 2009

(65) Prior Publication Data
US 2011/0038008 A1 Feb. 17, 2011

(51) Int. Cl.
*G06K 15/00* (2006.01)
*H04N 1/405* (2006.01)
*H04N 1/46* (2006.01)

(52) U.S. Cl. ....... 358/3.06; 358/3.09; 358/533; 358/534
(58) Field of Classification Search .................. None
See application file for complete search history.

(56) References Cited

U.S. PATENT DOCUMENTS

| | | | |
|---|---|---|---|
| 4,916,545 A | 4/1990 | Granger | |
| 5,155,599 A | 10/1992 | Delabastita | |
| 5,371,612 A | 12/1994 | Sakamoto | |
| 5,381,247 A | 1/1995 | Hains | |
| 5,442,461 A | 8/1995 | Levien | |
| 5,870,530 A | 2/1999 | Balasubramanian | |
| 5,892,891 A | 4/1999 | Dalal et al. | |
| 6,798,539 B1 | 9/2004 | Wang et al. | |
| 6,985,256 B2 | 1/2006 | Cheng et al. | |
| 7,139,101 B2 | 11/2006 | Loce et al. | |
| 7,675,651 B2 * | 3/2010 | Wang et al. | 358/3.06 |
| 7,679,787 B2 * | 3/2010 | Wang et al. | 358/3.06 |
| 7,898,692 B2 * | 3/2011 | Wang et al. | 358/3.06 |
| 7,933,044 B2 * | 4/2011 | Wang | 358/1.9 |
| 2002/0089708 A1 | 7/2002 | Cheng et al. | |
| 2004/0085588 A1 | 5/2004 | Loce et al. | |
| 2006/0232822 A1 | 10/2006 | Wang et al. | |
| 2006/0290992 A1 | 12/2006 | Loce et al. | |
| 2007/0140552 A1 | 6/2007 | Fan et al. | |
| 2008/0130054 A1 | 6/2008 | Wang et al. | |
| 2008/0130055 A1 | 6/2008 | Wang et al. | |
| 2008/0130056 A1 | 6/2008 | Wang et al. | |
| 2008/0278735 A1 | 11/2008 | Wang et al. | |

OTHER PUBLICATIONS

U.S. Appl. No. 12/539,848, filed Aug. 12, 2009, Wang et al.
T.M. Holladay, "An Optimum Algorithm for Halftone Generation for Displays and Hard Copies," Proc. Soc. For Information Display, 21, p. 185, 1980.
J.A.G. Yule, "Principles of Color Reproduction," John Wiley & Sons, N.Y., 1967.
S. Wang et al., "Non-Orthogonal Halftone Screens," Proc. NIP18: International Conference on Digital Printing Technologies, pp. 578,584, 2002.
R. Ulichney, "Digital Halftoning," Hexagonal Grids, The MIT Press, pp. 117-126, 1988.
M. Turbek et al., "Comparison of Hexagonal and Square Dot Centers for EP Halftones," PICS 2000, pp. 321-325.
Wang et al., "Uniform-rosette color halftoning for N-color moiré-free printing," Journal of Electronic Imaging, Apr.-Jun. 2008/vol. 16(2).

* cited by examiner

*Primary Examiner* — Twyler Haskins
*Assistant Examiner* — Barbara Reinier
(74) *Attorney, Agent, or Firm* — Fay Sharpe LLP

(57) ABSTRACT

Disclosed are moiré-free color halftoning methods, apparatus and systems to digitally reproduce an original color image. The disclosed embodiments are particularly useful for rendering a color image with a color printing device. According to one exemplary embodiment, an image forming method utilizes three or four rotated hexagonal screens which can include regular shaped hexagon screens or convex tessellated hexagon screens.

18 Claims, 12 Drawing Sheets
(12 of 12 Drawing Sheet(s) Filed in Color)

MOIRE-FREE COLOR HALFTONING METHODS, APPARATUS AND SYSTEMS

CROSS REFERENCE TO RELATED PATENTS AND APPLICATIONS

The following patent applications, the disclosures of each being totally incorporated herein by reference are mentioned:

U.S. patent application Ser. No. 12/539,848, Filed Aug. 12, 2009, entitled "MOIRÉ-FREE COLOR HALFTONING METHODS, APPARATUS AND SYSTEMS," by Wang et al.

U.S. patent application publication No. 20080130054, published Jun. 5, 2008, entitled "N-COLOR PRINTING WITH HEXAGONAL ROSETTES," by Shen-Ge Wang et al.

U.S. patent application publication No. 20080130055, published Jun. 5, 2008, entitled "MOIRÉ-FREE COLOR HALFTONE CONFIGURATION EMPLOYING COMMON FREQUENCY VECTORS," by Shen-Ge Wang et al.

U.S. patent application publication No. 20080130056, published Jun. 5, 2008, entitled "ROSETTE PRINTING WITH UP TO FIVE COLORS," by Shen-Ge Wang et al.

BACKGROUND

With the advent of inexpensive digital color printers, methods and systems of color digital halftoning have become increasingly important in the reproduction of printed or displayed images possessing continuous color tones. It is well understood that most digital color printers operate in a binary mode, i.e., for each color separation, a corresponding colorant spot is either printed or not printed at a specified location or pixel. Digital halftoning controls the printing of colorant spots, where the spatial averaging of the printed colorant spots by either a human visual system or a viewing instrument, provides the illusion of the required continuous color tones. In the art of printing, the color tone that results from the overlay of the halftone spots from multiple colorants is often referred to as "process color." Color separations can be thought of as multiple channels that can be used to define the color of an image. Color separations are sometimes called colorant separations because they are used to specify amounts of colorants required to achieve a target perception of color.

The most common halftone technique is screening, which compares the required continuous tone colorant level of each pixel for each color separation with one or more predetermined threshold levels. The predetermined threshold levels are typically defined for a rectangular cell that is tiled to fill the plane of an image, thereby forming a halftone screen of threshold values. At a given pixel if the required continuous tone colorant level is darker than the threshold halftone level, a colorant spot is printed at that specified pixel. Otherwise the colorant spot is not printed. The output of the screening process is a binary pattern of multiple small "dots", which are regularly spaced as is determined by the size, shape, and tiling of the halftone cell. In other words, the screening output halftone image separation, as a two-dimensionally repeated pattern, possesses two fundamental spatial frequencies, which are completely defined by the geometry of the halftone screen.

It is understood in the art that the distribution of printed pixels in a color halftone image separation depends on the design of the halftone screen. For clustered-dot halftone screens, all printed pixels formed using a single halftone cell typically group into one or more clusters. If a halftone cell only generates a single cluster, it is referred to as a single-dot halftone or single-dot halftone screen. Alternatively, halftone screens may be dual-dot, tri-dot, quad-dot, or the like.

While halftoning is often described in terms of halftone dots, it should be appreciated that idealized halftone dots can possess a variety of shapes that include rectangles, squares, lines, circles, ellipses, "plus signs", X-shapes, pinwheels, and pincushions, and actual printed dots can possess distortions and fragmentation of those idealized shapes introduced by digitization and the physical printing process. Various digital halftone screens having different shapes and angles are described in "An Optimum Algorithm for Halftone Generation for Displays and Hard Copies", by T. M. Holladay, Proc. Soc. for Information Display, 21, p. 185, 1980.

A common problem that arises in digital color halftoning is the manifestation of moiré patterns. Moiré patterns are undesirable interference patterns that occur when two or more color halftone image separations are printed over each other. Since color mixing during the printing process is a non-linear process, frequency components other than the fundamental frequencies and harmonics of the individual color halftone image separations can occur in the final printout. For example, if an identical halftone screen is used for two color image separations, theoretically, there should be no moiré patterns. However, any slight misalignment between the two color halftone image separations occurring from an angular difference and/or a scalar difference will result in two slightly different fundamental frequency vectors. Due to nonlinear color mixing the difference in frequency vectors produces a beat frequency which will be visibly evident as a very pronounced moiré interference pattern in the output. Additionally, lateral displacement misregistration can result in significant color shifts if an identical halftone screen is used for two color image separations. To avoid, for example, two-color moiré patterns and other color shifts due to misalignment and misregistration, or for other reasons, different halftone screens are commonly used for different color image separations, where the fundamental frequency vectors of the different halftone screens are separated by relatively large angles. Therefore, the frequency difference between any two fundamental frequencies of the different screens will be large enough so that no visibly objectionable moiré patterns are produced.

In selecting different halftone screens, for example for three color image separations, it is desirable to avoid any two-color moiré as well as any three-color moiré. It is well known that in the traditional printing industry that three halftone screens, which can be constructed by halftone cells that are square in shape and identical, can be placed at 15°, 45°, and 75°, respectively, from a point and axis of origin, to provide the classical three-color moiré-free solution. This is described in "Principles of Color Reproduction", by J. A. G. Yule, John Wiley & Sons, N.Y., 1967.

However, for digital halftoning, the freedom to select a rotation of a halftone screen is limited by the raster structure, which defines the position of each pixel. Since tan (15°) and tan (75°) are irrational numbers, a halftone screen at a rotation of 15° or 75° cannot be implemented exactly in digital halftoning. To this end, some methods have been proposed to provide approximate instead of exact moiré-free solutions. For example, in U.S. Pat. No. 4,916,545, moiré is suppressed by randomly varying the dot fonts that are used to write successive halftone dots in the screened image. In U.S. Pat. No. 5,442,461, strips of a rational angled screen are concatenated to approximate an irrational angled screen. Errors which accumulate with each successive pixel are corrected by occasionally jumping to a new point in the strip. However, all these approximate solutions result in some halftone dots having centers that do not lie directly on addressable points, or on the pixel positions defined by the raster structure. Therefore, the shape and center location varies from one halftone dot to another. Consequently, additional interference or moiré between the screen frequencies and the raster frequency can occur. In another approach, U.S. Pat. No. 5,371,612 discloses a moiré prevention method to determine screen angles and sizes that is usable solely for square-shaped, halftone screens.

U.S. Pat. No. 5,155,599 to Delabastita discloses a screening system and method for reproduction of images in printing. The screening angles that are used are close, but not identical to conventional screening angles. The reproduction is nevertheless Moiré free by the fact that the deviations in angles from the conventional system are exactly offset by the deviations in line rulings. The screening system is particularly advantageous when used for combinations of screens with rational tangent angles. The Moiré free combination of rational tangent screens can be rotated by a constant angle with the amount of rotation controlled in small increments.

U.S. Pat. No. 6,798,539 to Wang et al., discloses methods for using single-cell, non-orthogonal clustered-dot screens to satisfy the moiré-free conditions for color halftoning. The disclosure also provides methods that combine single-cell non-orthogonal clustered-dot screens and line screens for moiré-free color halftoning. Particularly, the selection of these single-cell halftone screens is determined by satisfying moiré-free conditions provided in the respective spatial or frequency equations.

The difficulty in avoiding moiré between halftone screens is further exacerbated by the common practice of printing four colors. Four-color printing typically employs halftoning methods for the yellow image separation that produce less than optimal image quality. Typical clustered-dot methods often possess some residual moiré. The typical clustered-dot yellow configuration assumes square halftone cells and places yellow at 0° with a frequency that is ≈10% higher than the other screens. Low contrast moiré can be seen in many printed images for certain combinations of yellow and other colorants. Another common configuration for yellow utilizes a stochastic screen or error diffusion for yellow. That configuration results in a high degree of instability when used on many different printers. The result is inconsistency of color page-to-page and non-uniformity of color within a page.

There are several high quality printing applications that require more than four image separations. For example, high fidelity ("hi-fi") color printing typically utilizes one or more additional primary colors as colorants to extend the gamut of a print engine. Two common choices of additional primaries are orange and green, but other colors, such as red, blue and violet may be used. A well known example of high fidelity printing is Pantone Hexachrome® printing. Low chroma printing employs an additional toner or ink with the same or similar hue as a conventional toner. For example, low chroma magenta may be used along with conventional magenta to enable smoother tone gradations and reduced texture in flesh tones compared to using conventional magenta alone. Typical low chroma, or light, colorants include light magenta, light cyan, and gray. Dark yellow is also used as a low chroma colorant. Other printing methods including more than four colorants may employ special colorants such as white, metallics and fluorescents, and may have applications in security and special imaging effects.

Due to moiré considerations associated with additional clustered-dot halftone screens, the alternatives currently available for fifth channel (separation) halftoning suffer from instability, less than desirable halftone structure appearance, or limitations on applications. For example, stochastic screens and error diffusion have been used for hi-fi color and low chroma toners, but the small dot sizes tend to produce unstable results for xerography and offset printing. Line screens have also been used, but the line structure tends to be considered undesirable unless used at very high frequencies, which can be unstable. Some methods utilize the same screen for a hi-fi colorant and for its complimentary colorant (e.g., same screen for cyan and orange), but that method can place limitations on the color management operations and does not apply to low chroma toners.

U.S. Pat. No. 5,870,530 to Balasubramanian discloses a "hi-fi" color printing system, wherein colorants of secondary colors beyond the regular CMYK (cyan, magenta, yellow, black) primary colorants are available, and the colorants of the secondary colors are substituted for combinations of the primary colorants in order to obtain a full color gamut. The functions by which colorants of the secondary colors are substituted for primary colorant are non-linear through a path in the color space.

U.S. Pat. No. 5,892,891 to Dalal et al. discloses a "hi-fi" color printing system, wherein colorants of hi-fi colors beyond the regular CMYK primary colorants are available, a main gamut obtainable with the CMYK colorants only is mutually exclusive with at least one extended gamut in which a hi-fi colorant is used and a complementary one of the CMY colorants is excluded. Because the main and extended gamuts are mutually exclusive, no more than four colorants are used in any part of the image, and no more than four halftone screens need be used to obtain any desired color.

The above indicated patents and citations provide a background basis for the disclosure as taught in the specification which follows below, and further for each of the patents and citations above, the disclosures therein are totally incorporated herein by reference in their entirety for their teachings.

As provided herein, there are supplied teachings to systems and methods that utilize three or four rotated hexagonal screens, or more precisely, screens that generate hexagonally tiled clusters, for moiré-free color printing

INCORPORATION BY REFERENCE

The following references are incorporated totally herein in their entirety:

U.S. Pat. No. 5,381,247, issued Jan. 10, 1995, entitled METHOD FOR REDUCING 2-COLOR MOIRÉ IN 4-COLOR PRINTING," by Hains.

S. Wang, Z. Fan and Z. Wen, "Non-Orthogonal Halftone Screens," *Proc. NIP*18: *International Conference on Digital Printing Technologies*, pages 578-584, 2002.

R. Ulichney, "Digital Halftoning," The MIT Press, pages 117-126, 1988.

M. Turbek, S. Weed, T. Cholewo, B. Damon, M. Lhamon, "Comparison of Hexagonal and Square Dot Centers for EP Halftones," PICS 2000, pages 321-325.

BRIEF DESCRIPTION

In one embodiment of this disclosure, described is a moiré-free halftone image forming method for reproducing an image using a different halftone screen with hexagonally tiled clusters for each colorant associated with an image rendering device, the method comprising: a) defining a first colorant halftone screen with hexagonally tiled clusters having a first fundamental frequency vector $V_{c1}$, a second fundamental frequency vector $V_{c2}$, and a third fundamental frequency vector $V_{c3}$, where $V_{c3}=V_{c1}-V_{c2}$, $A(V_{c2}, V_{c1})$ is substantially 60° and $A(V_{c1}, V_{c3})$ is substantially 60°; b) defining a second colorant halftone screen with hexagonally tiled clusters having a first fundamental frequency vector $V_{m1}$, a second fundamental frequency vector Vm2 and a third fundamental frequency vector Vm3, where Vm3=Vm1−Vm2, A(Vm2, Vm1) is substantially 60° and A(Vm1, Vm3) is substantially 60°; c) selecting the values of the fundamental frequency vectors Vc1, Vc2, Vc3, Vm1, Vm2, Vm3 such that |Vc1| is substantially equal to |Vc2| which is substantially equal to |Vc3|, |Vm1| is substantially equal to |Vm2| which is substantially equal to |Vm3|, Vc1 and Vm1 are separated by substantially 30°, Vc2 and Vm2 are separated by substantially 30°, and Vc3 and Vm3 are separated by substantially 30°; d) generating the first colorant halftone screen, and the second colorant halftone screen; e) applying the first colorant halftone screen to the image to produce a first colorant halftone output, and applying the second colorant halftone screen to the image to produce a second colorant halftone output; and f) overlaying the first colorant halftone output and the second colorant halftone output to reproduce the image with a moiré-free halftone image.

In another embodiment of this disclosure, described is a computer program product comprising a computer-usable data carrier storing instructions that, when executed by a computer, cause the computer to perform a moiré-free halftone image forming method for reproducing an image using a different halftone screen with hexagonally tiled clusters for each colorant associated with an image rendering device, the method comprising a) defining a first colorant halftone screen with hexagonally tiled clusters having a first fundamental frequency vector $V_{c1}$, a second fundamental frequency vector $V_{c2}$, and a third fundamental frequency vector $V_{c3}$, where $V_{c3}=V_{c1}-V_{c2}$, and $A(V_{c2}, V_{c1})$ and $A(V_{c1}, V_{c3})$ are substantially 60°; b) defining a second colorant halftone screen with hexagonally tiled clusters having a first fundamental frequency vector $V_{m1}$, a second fundamental frequency vector $V_{m2}$ and a third fundamental frequency vector $V_{m3}$, where $V_{m3}=V_{m1}-V_{m2}$, and $A(V_{m2}, V_{m1})$ and $A(V_{m1}, V_{m3})$ are substantially 60°; c) selecting the values of the fundamental frequency vectors $V_{c1}, V_{c2}, V_{c3}, V_{m1}, V_{m2}, V_{m3}$ such that |$V_{c1}$| is substantially equal to |$V_{c2}$| which is substantially equal to |$V_{c3}$|, |$V_{m1}$| is substantially equal to |$V_{m2}$| which is substantially equal to |$V_{m3}$|, $V_{c1}$ and $V_{m1}$ are separated by substantially 30°, $V_{c2}$ and $V_{m2}$ are separated by substantially 30°, and $V_{c3}$ and $V_{m3}$ are separated by substantially 30°; d) generating the first colorant halftone screen, and the second colorant halftone screen; e) applying the first colorant halftone screen to the image to produce a first colorant halftone output, and applying the second colorant halftone screen to the image to produce a second colorant halftone output; and f) overlaying the first colorant halftone output and the second colorant halftone output to reproduce the image with a moiré-free halftone image.

In still another embodiment of this disclosure, described is a printing apparatus comprising an image marking device for rendering a color image on a media substrate; and a controller configured to receive a representation of an image for rendering on the image marking device, the controller configured to execute instructions to perform a moiré-free halftone image forming method for reproducing an image using a different halftone screen with hexagonally tiled clusters for each colorant associated with the image marking device, the method comprising a) defining a first colorant halftone screen with hexagonally tiled clusters having a first fundamental frequency vector $V_{c1}$, a second fundamental frequency vector $V_{c2}$, and a third fundamental frequency vector $V_{c3}$, where $V_{c3}=V_{c1}-V_{c2}$, and $A(V_{c2}, V_{c1})$ $A(V_{c1}, V_{c3})$ are substantially 60°; b) defining a second colorant halftone screen with hexagonally tiled clusters having a first fundamental frequency vector $V_{m1}$, a second fundamental frequency vector $V_{m2}$ and a third fundamental frequency vector $V_{m3}$, where $V_{m3}=V_{m1}-V_{m2}$, and $A(V_{m2}, V_{m1})$ and $A(V_{m1}, V_{m3})$ are substantially 60°; c) selecting the values of the fundamental frequency vectors $V_{c1}, V_{c2}, V_{c3}, V_{m1}, V_{m2}, V_{m3}$ such that |$V_{c1}$| is substantially equal to |$V_{c2}$| which is substantially equal to |$V_{c3}$|, |$V_{m1}$| is substantially equal to |$V_{m2}$| which is substantially equal to |$V_{m3}$|, $V_{c1}$ and $V_{m1}$ are separated by substantially 30°, $V_{c2}$ and $V_{m2}$ are separated by substantially 30°, and $V_{c3}$ and $V_{m3}$ are separated by substantially 30°; d) generating the first colorant halftone screen, and the second colorant halftone screen; e) applying the first colorant halftone screen to the image to produce a first colorant halftone output, and applying the second colorant halftone screen to the image to produce a second colorant halftone output; and f) overlaying the first colorant halftone output and the second colorant halftone output to reproduce the image with a moiré-free halftone image.

In yet another embodiment of this disclosure, described is a computer program product comprising a computer-usable data carrier storing instructions that, when executed by a computer, cause the computer to perform a moiré-free halftone image forming method for reproducing an image using a different halftone screen with hexagonally tiled clusters for each colorant associated with an image rendering device, the method comprising a) defining a first colorant halftone screen with hexagonally tiled clusters having a first fundamental frequency vector $V_{c1}$, a second fundamental frequency vector $V_{c2}$, and a third fundamental frequency vector $V_{c3}$, where $V_{c3}=Vc1-V_{c2}$; b) defining a second colorant halftone screen with hexagonally tiled clusters having a first fundamental frequency vector $V_{m1}$, a second fundamental frequency vector $V_{m2}$ and a third fundamental frequency vector $V_{m3}$, where $V_{m3}=V_{m1}-V_{m2}$; c) defining a third colorant halftone screen with hexagonally tiled clusters having a first fundamental frequency vector $V_{y1}$, a second fundamental frequency $V_{y2}$ and a third fundamental frequency $V_{y3}$, where $V_{y1}=V_{m1}+V_{c2}$, $V_{y2}=V_{m2}-V_{c3}$ and $V_{y3}=V_{y1}-V_{y2}$; d) generating the first colorant halftone screen, the second colorant halftone screen and the third colorant halftone screen; and e) applying the first colorant halftone screen to the image to produce a first colorant halftone output, applying the second colorant halftone screen to the image to produce a second colorant halftone output, and applying the third colorant halftone screen to the image to produce a third colorant halftone output; and f) overlaying the first colorant halftone output, the second colorant halftone output and the third colorant halftone output to reproduce the image with a moiré-free halftone image.

In another embodiment of this disclosure, disclosed is a printing apparatus comprising an image marking device for rendering a color image on a media substrate; and a controller configured to receive a representation of an image for rendering on the image marking device, the controller configured to execute instructions to perform a moiré-free halftone image forming method for reproducing an image using a different halftone screen with hexagonally tiled clusters for each colorant associated with the image marking device, the method comprising: a) defining a first colorant halftone screen with hexagonally tiled clusters having a first fundamental frequency vector $V_{c1}$, a second fundamental frequency vector $V_{c2}$, and a third fundamental frequency vector $V_{c3}$, where $V_{c3}=V_{c1}-V_{c2}$; b) defining a second colorant halftone screen with hexagonally tiled clusters having a first fundamental frequency vector $V_{m1}$, a second fundamental frequency vector $V_{m2}$ and a third fundamental frequency vector $V_{m3}$, where $V_{m3}=V_{m1}-V_{m2}$; c) defining a third colorant halftone screen with hexagonally tiled clusters having a first fundamental frequency vector $V_{y1}$ a second fundamental frequency $V_{y2}$ and a third fundamental frequency $V_{y3}$, where $V_{y1}=V_{m1}+V_{c2}$, $V_{y2}=V_{m2}-V_{c3}$ and $V_{y3}=V_{y1}-V_{y2}$; d) generating the first colorant halftone screen, the second colorant halftone screen and the third colorant halftone screen; e) applying the first colorant halftone screen to the image to produce a first colorant halftone output, applying the second colorant halftone screen to the image to produce a second colorant halftone output, and applying the third colorant halftone screen to the image to produce a third colorant halftone output; and f) overlaying the first colorant halftone output and the second colorant halftone output, and the third colorant halftone output to reproduce the image with a moiré-free halftone image.

BRIEF DESCRIPTION OF THE DRAWINGS

"The patent or application file contains at least one drawing executed in color. Copies of this patent or patent application publication with color drawings will be provided by the Office upon request and payment of the necessary fee."

FIG. 1B represents a darker color tone requiring larger halftone dots than the color tone of FIG. 1A.

FIG. 7B represents a darker color tone requiring larger halftone dots than the color tone of FIG. 7A.

FIG. 12B represents a darker color tone requiring larger halftone dots than the color tone of FIG. 12A.

DETAILED DESCRIPTION

Figure 1B:
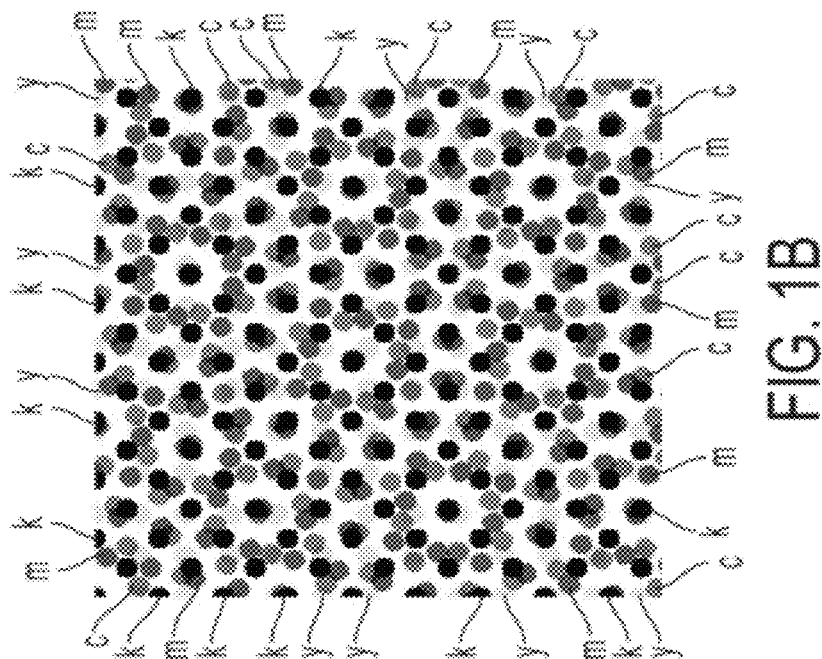
FIGS. 1A and 1B illustrate the superposition of cyan, magenta, yellow and black halftone image separations in a conventional configuration.

The present disclosure and embodiments described herein provide halftoning methods and halftone configurations utilizing three or four rotated regular hexagonal screens, or more precisely, screens with hexagonally tiled clusters, for moiré-free color printing. The configuration has the following properties. Each screen is constructed of regular hexagons, where a screen can be thought of as having three fundamental frequencies of equal vector length separated by 60°. In a first set of screens (screen $S_1$ and screen $S_2$), the frequency vectors of screen $S_1$ are of equal length to the vectors of screen $S_2$, and the frequency vectors of screen $S_1$ are separated by 30° from the vectors of screen $S_2$. A second set of screens (screen $S_3$ and screen $S_4$) also have equal length frequency vectors and are separated by 30°, but their frequency length is $\sqrt{2}$ greater than those of the first set of screens and the frequency vectors are rotated 15° from the first set of screens.

By way of additional background, hexagonal screens provide pleasant-looking and compact halftone structures and have been brought to interest from time to time in the printing industry (see U.S. Pat. No. 5,381,247, "Method for Reducing 2-Color Moiré in 4-Color Printing," by Hains). But, it is very difficult to avoid moiré in using multiple hexagonal screens because each screen possesses three equal-length "fundamental" frequencies instead of only two fundamentals in conventional square or rectangular screens.

1. Frequency Representation of Periodic Halftone Patterns

Clustered-dot halftoning methods produce halftone images that possess strong periodic structures defined by the halftone screens. For the purposes of moiré analysis, these images can be well described in the frequency domain by discrete components without regard to amplitude and phase. In this frequency domain representation, a two-dimensional halftone screen and halftone output for a single colorant x forms a frequency lattice that can be described by two generator vectors $V_{x1}, V_{x2}$. The generator vectors correspond to the two fundamental frequencies of the halftone. Linear combinations of these fundamental frequency vectors form all points (harmonics) in the lattice and no frequencies are formed that are lower than the fundamentals.

Moiré analysis for conventional halftoning focuses on Cyan (C), Magenta (M), and Black (K). Yellow (Y) is usually include in some suboptimal manner, which may or may not be fully acceptable depending upon the visibility of yellow and its interaction with the other colorants The fundamental vector frequencies for C, M, and K can be denoted $V_{c1}, V_{c2}, V_{m1}$, $V_{m2}, V_{k1}$, and $V_{k2}$, respectively. Unless otherwise noted, we use the subscripts c, m, y, and k, to aid in teaching the presently described halftoning processes due to the common practice of four-color printing with cyan, magenta, yellow, and black colorants. While we teach using that notation, the concepts are general in that other colorants may be used. For example, we may use the notation $V_{m1}$ and use examples that refer to it as a frequency vector for the magenta screen, but it is to be understood that we intend it to generally imply a frequency vector for the halftone screen or halftone output of some available colorant. Further, we note that colorants for particular screen geometries are interchangeable. For example, we may teach with yellow halftoned with a screen of a first geometry, and black halftoned with a screen of a second geometry, but it is practical and reasonable to assume that the screens may be interchanged and yellow may be halftoned with the screen of the second geometry and black the first. Also, we note that we can interchangeable refer to the frequency vectors of the halftone screen or of the halftone image output, where the screen here is interpreted as the tiled halftone threshold array. Note that it is common practice in the art of halftoning to refer to both the tiling of the threshold array and the halftone output as the "screen." Since the frequency vectors for both entities are the same, we also follow that practice unless we are clearly indicating the thresholding screen or the halftone output.

Figure 1A:
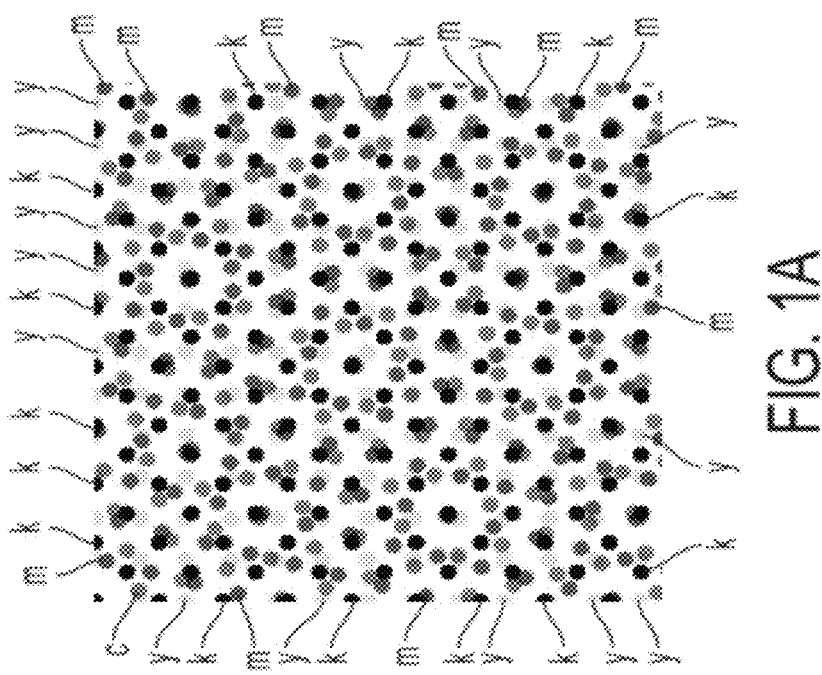
Figure 2:
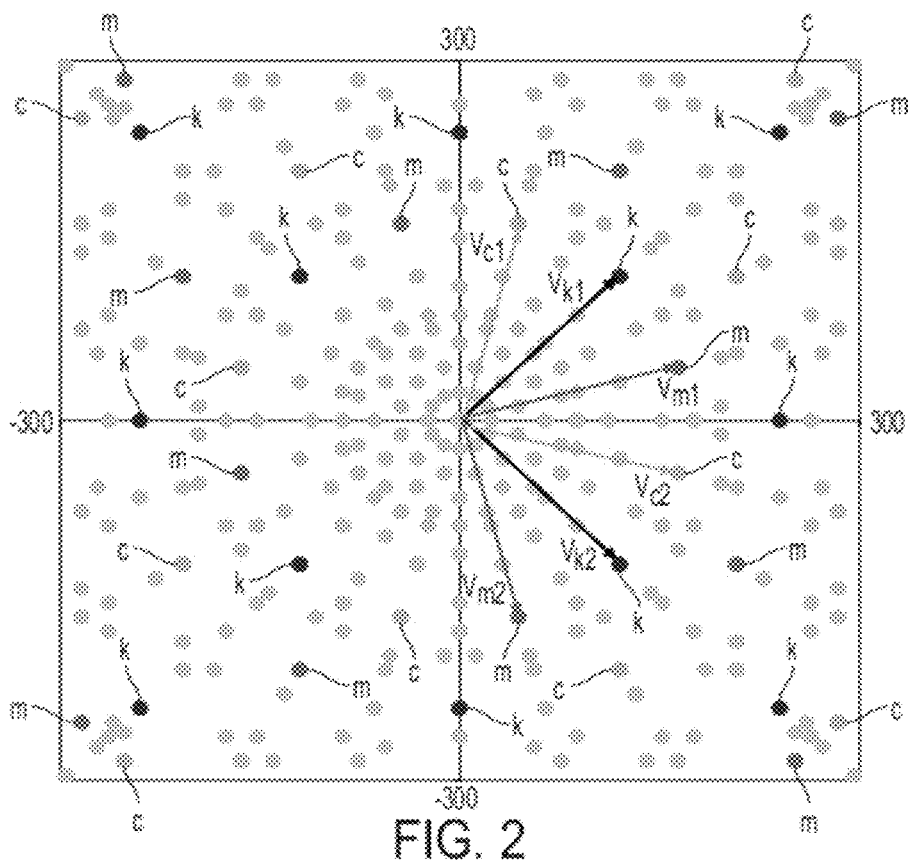
FIG. 2 is a Fourier representation of cyan, magenta and black halftone image separations in a conventional configuration.

FIG. 1 illustrates the appearance for the overlay of C, M, Y and K halftone output based on a traditional configuration, with the cyan pattern at 75°/−15°; magenta at 15°/−75°; black at 45°/−45°, and yellow at 0°/90°. The traditional configuration uses the same halftone screen for C, M, and K, with square cells rotated to given angles. While the individual screens and halftone output are periodic, the resulting combined halftone texture, often referred as the rosette pattern, is not a simple repeated pattern and its Fourier representation is complicated. FIG. 2 shows the frequency vector representation of the C, M, and K, screens, which is used below for the moiré analysis.

The Fourier transform is dominated by discrete frequency components shown as circular dots. The discrete components are defined by the two fundamental halftone frequencies for each screen, their two-dimensional higher-order harmonics (which can be considered to be linear combinations of the fundamentals), and linear combinations of components from different screens (which are beats or forms of moiré). Note that phase is not represented in these plots and also there are many higher-order harmonics of the halftone frequencies that not shown in the plots.

In color printing, the superposition of halftone screens creates more frequency components than exist in the single separations of the various process colors. We can express the result caused by superposition of two different colors as their frequency-vector difference, e.g., $V_{cm} = V_c \pm V_m$, where $V_c$ and $V_m$ are two frequency components from C and M, and $V_{cm}$ is the difference vector. Since each Fourier component has its conjugate, i.e., there is always a frequency vector $-V_c$ that represents the conjugate component of $V_c$, the sign definition of frequency vectors is rather arbitrary. For each halftone screen, there are two fundamental frequency vectors, therefore, the color mixing of two screens for two different colors yields eight difference vectors by the fundamental frequencies alone. Considering other harmonics of the halftone frequencies, the combinations can yield a large number of difference vectors.

2. Moiré-Free Conditions

Multiple periodic phenomena can interfere to produce lower frequencies known as beats. In the field of halftoning, these beats appear as potentially objectionable moiré. There are particular configurations of halftones that avoid creating objectionable moiré. The conventional moiré-free halftoning method utilizes screens for C, M and K, such that 3-way combinations of their fundamental frequencies sum to zero frequency or very high frequencies. Typically, the screens are chosen to be composed of square cells, and the frequencies are chosen to be roughly equal with the angles separated by about 30°.

The common strategy to avoid any two-color moiré is to ensure that no two-color difference vector due to fundamental halftone frequencies is too small. Using C and M halftones as an example, the two-color moiré-free condition can be summarized by $$|V_c \pm V_m| > V_{min}. \quad (1)$$

where $V_c$ represents any one of $V_{c1}$, $-V_{c1}$, $V_{c2}$, $-V_{c2}$; $V_m$ represents any one of $V_{m1}$, $-V_{m1}$, $V_{m2}$, $-V_{m2}$; and $V_{min}$ is a frequency limit set at somewhere 50-70 lines-per-inch to avoid visually objectionable moirés.

It is well known that the most troublesome moiré is the three-color moiré that can appear in cyan-magenta-black prints produced by CMYK four-color printers. As an extension of the two-color case, one condition for three-color moiré-free printing can be summarized by, $$|V_c \pm V_m \pm V_k| > V_{min}. \quad (2)$$

where $V_k$ represents any one of $V_{k1}$, $-V_{k1}$, $V_{k2}$, $-V_{k2}$; and $V_{min}$ is set similar to the two-color case.

Unless the halftone fundamental frequencies are very high, say >>200 cycles/inch, it is very difficult to make all three-color difference vectors, as well as all two-color difference vectors large enough to avoid any objectionable color moiré because there are thirty-two combinations of different components. A common alternative approach is to make two of the three-color difference vectors null while keeping the rest large. This design practice for three-color moiré-free halftone printing can be specified by the following two vector equations:

$$V_{c1} - V_{m1} + V_{k2} = 0, \quad (3a)$$

$$V_{c2} - V_{m2} + V_{k1} = 0. \quad (3b)$$

Figure 3A:
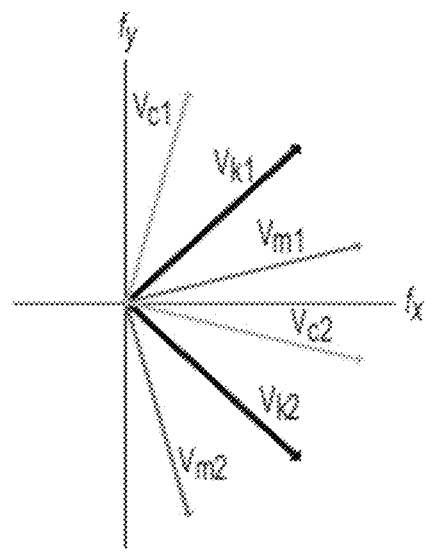
FIG. 3A illustrates the screen frequency vectors for a conventional halftone design and FIG. 3B illustrates the conventional screen frequency vectors shown to sum to zero frequency.
Figure 3B:
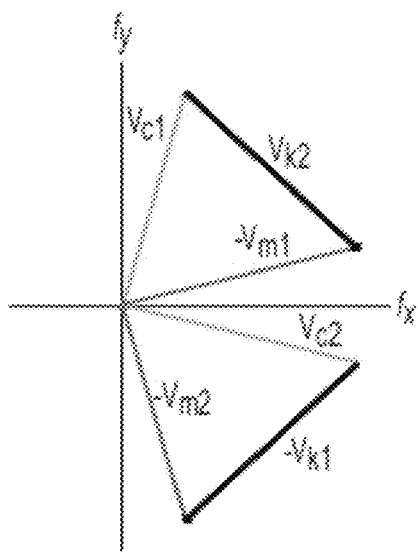

The Eqs. (3a) and (3b) are two of all possible frequency combinations of the three colors. In most practical applications, the remaining combinations satisfy the inequality of Eq. (2). It is instructive to view the frequency vectors of the conventional moiré-free configuration. FIG. 3(a) shows the fundamental frequency vectors of the individual screens, and 3(b) shows the vectors combinations of Eq. (3).

The present disclosure and embodiments described herein include a halftoning method and halftone configuration utilizing three or four rotated regular hexagonal screens, or more precisely, screens with hexagonally tiled clusters, for moiré-free color printing. Halftone designers consider many options to deliver a screen with desirable characteristics, and often must settle for less than desirable results. The present method presents a new option with several beneficial properties compared to conventional square-cell-based screens. Hexagonal screens can appear to have smoother texture. Due to differences in packing geometry and touch point geometry, hexagons have the potential to possess different tone reproduction characteristics, which may be favorable for some marking processes. A fourth screen (e.g., Y) can be included moiré-free, thereby avoiding problems associated with stochastic solutions for Y.

The configuration has the following properties. Each screen is constructed of regular hexagons, where a screen can be thought of as having three fundamental frequencies of equal vector length separated by 60°. In a first set of screens (screen $S_1$ and screen $S_2$), the frequency vectors of screen $S_1$ are of equal length to the vectors of screen $S_2$, and the frequency vectors of screen $S_1$ are separated by 30° from the vectors of screen $S_2$. A second set of screens (screen $S_3$ and screen $S_4$) also have equal length frequency vectors and are separated by 30°, but their frequency length is $\sqrt{2}$ greater than those of the first set of screens and the frequency vectors are rotated 15° from the first set of screens.

3. Hexagonally-Tiled-Clustered Halftone and its Frequency Representation

Figure 4:
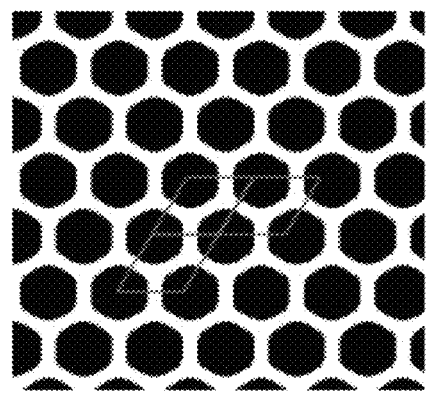
FIG. 4 illustrates a halftone image pattern hexagonally tiled with regular hexagon-shaped clusters according to an exemplary embodiment of this disclosure.

Halftones with hexagonal tiling and hexagonal shape clusters are visually pleasing and theoretically the most compact halftone structure (see example in FIG. 4). Hexagonal halftones have been discussed in several publications and patents (see Hains, "Method for reducing 2-color moiré in 4-color printing," U.S. Pat. No. 5,381,247; S. Wang, Z. Fan and Z. Wen, "Non-orthogonal halftone screens," *Proc. NIP18: International Conference on Digital Printing Technologies*, pages 578-584, 2002), but a frequency analysis and connection to moiré in color printing is lacking.

Figure 5:
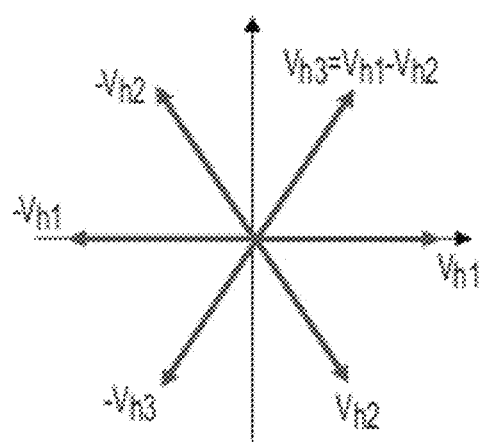
FIG. 5 illustrates a Fourier representation of the regular hexagonal halftone image pattern shown in FIG. 4.

Although the appearance of hexagonally tiled hexagon clusters is quite different from square or rectangularly tiled clusters, spatially repeated hexagons are essentially the result of tiling, or two-dimensional replication using a parallelogram, shown in the example by the outlines. Hence, the hexagonal halftone shown in FIG. 4 is a two-dimensional periodic structure and can be represented by two fundamental frequency vectors, $V_{h1}$ and $V_{h2}$, shown in FIG. 5, defined for the corresponding non-orthogonal parallelogram screen. As discussed in the previous sections, a two-dimensionally repeated halftone pattern possesses many frequency harmonics as linear combination of the two fundamentals. For a hexagonal halftone pattern, one of the harmonics is noteworthy because its frequency vector length is exactly the same as the length of the two fundamentals if the hexagons are regular (i.e., 0-60-120-degree). The hexagons in FIG. 4 are regular and the noteworthy vector is shown as $V_{h3}=V_{h1}-V_{h2}$ in FIG. 5.

It is not difficult to see that any two of the three vectors, $V_{h1}$, $V_{h2}$ and $V_{h3}$, can be used as fundamental frequency vectors and the third is always equal to the sum of the two fundamentals (or their conjugates). Thus, we may loosely refer to the set of three as the "fundamentals" of a hexagonal halftone screen. In the following discussion, we use quotation marks for the three "fundamentals" to avoid confusion with the original meaning of fundamental frequencies for two-dimensional periodic functions in Fourier analysis.

4. Moiré-Free Condition for Regular Hexagonal Screens

The interference of the various colors separations when using multiple hexagonal halftone screens is much more complicated than the interference due to square-cell screens. Because of the presence of three "fundamentals" in a hexagonal halftone screen, the moiré-free conditions, Eqs. (1)-(3), described previously have to be extended to all combinations of frequency vectors chosen from a redefined "fundamentals". For each hexagon screen involved, the third "fundamental" $V_{h3}$ is defined as $$V_{h3}=V_{h1}-V_{h2}, \quad (4)$$

where $V_{h1}$ and $V_{h2}$ are the two fundamental frequency vectors defined previously for the general non-orthogonal screens and the angle between $V_{h2}$ and $V_{h1}$, $|A(V_{h2}, V_{h1})|$ is substantially 60°. Note that $A(V_a, V_b)$ denotes the angle from the vector $V_a$ to vector $V_b$.

In the conventional three-color moiré-free halftoning cases, three rotated screens with square cells are separated by 30° between the halftone color separations. It is clear that the same approach does not work for the hexagonal case because rotating a regular hexagon by 60° results in an identical appearance. Another initial thought is to rotate the three (C, M, and K) hexagonal screens by ⅓ of the symmetry to evenly divide the angle space, similar to rotating the three square-cell screens by ⅓ of their symmetry (90°). Examination of Eq. (3) shows that angular separation by 20° does not produce a moiré-free screen set. Evidently, it is not straightforward to satisfy moiré-free conditions using rotated regular halftonal screens. This might be the reason why there have not been much real applications of hexagon screens in color halftoning.

5. Moiré-Free Solution using Four Rotated Hexagonal Screens

The general principle that defines the configuration is the following. The periodic structure of each screen is constructed of regular hexagon tiles, where a screen can be thought of as having three "fundamental" frequencies of equal vector length separated by 60°. In a first set of screens (screen $S_1$ and screen $S_2$), the frequency vectors of screen $S_1$ are of equal length to the vectors of screen $S_2$, and the frequency vectors of screen $S_1$ are separated by 30° from the vectors of screen $S_2$. A second set of screens (screen $S_3$ and screen $S_4$) also have equal length frequency vectors and are separated by 30°, but their frequency length is $\sqrt{2}$ greater than those of the first set of screens and the frequency vectors are rotated 15° from the first set of screens. While we describe four screens in the above configuration, any three of that configuration is a novel and useful configuration (e.g., CMK adhering to these rules, and Y halftoned by another method, such as stochastic screening, is novel and interesting).

Let us examine a specific case of interest. We propose a configuration using three or four halftone screens with regular-hexagon-symmetry for moiré-free color halftoning. The proposed configuration is shown by the frequency vectors in FIG. 6. We denote the "fundamentals" of the four screens as $V_{c1}, V_{c2}, V_{c3}, V_{m1}, V_{m2}, V_{m3}, V_{y1}, V_{y2}, V_{y3}, V_{k1}, V_{k2}$ and $V_{k3}$. For the case with regular hexagons, $|V_{c1}|=|V_{c2}|=|V_{c3}|$, $|V_{m1}|=|V_{m2}|=|V_{m3}|$, $|V_{y1}|=|V_{y2}|=|V_{y3}|$ and $|V_{k1}|=|V_{k2}|=|V_{k3}|$.

Figure 6:
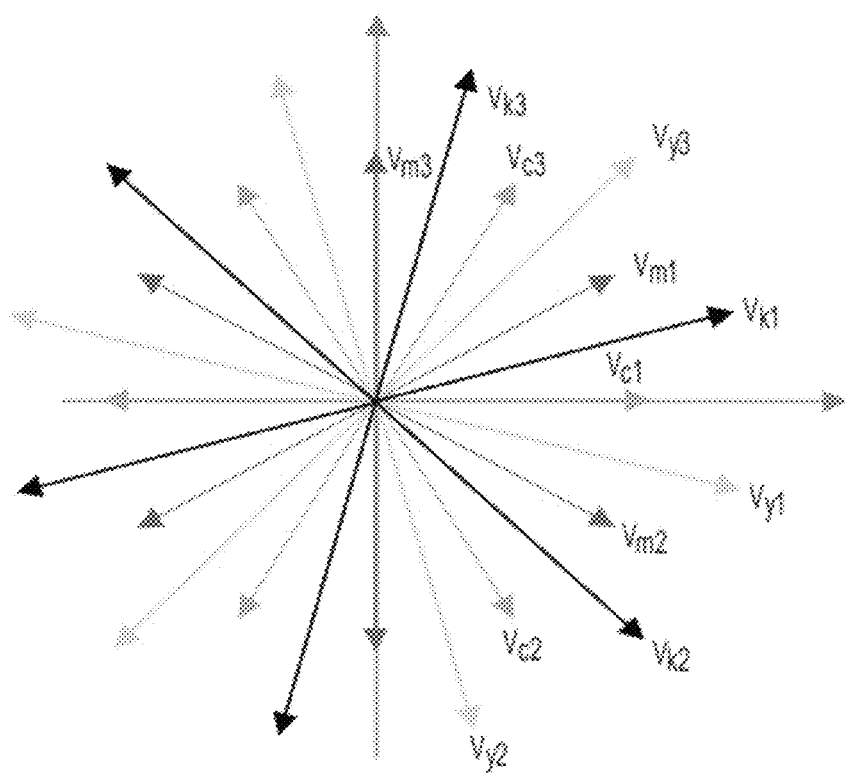
FIG. 6 illustrates fundamental frequency vectors for moiré-free color halftoning using four regular hexagonally tiling screens according to an exemplary embodiment of this disclosure.

In FIG. 6, the angle between $V_{c1}$ and $V_{m1}$ is 30°, $A(V_{c1}, V_{m1})=30°$; between $V_{c1}$ and $V_{k1}$ is 15°, $A(V_{c1}, V_{k1})=15°$; and between $V_{c1}$ and $V_{y1}$ is 15°, $A(V_{c1}, V_{y1})=-15°$. In addition, the proposed configuration requires $$|V_{c1}|=|V_{m1}|, \quad (5a)$$

$$|V_{y1}|=|V_{k1}|=\sqrt{2}\cdot|V_{c1}|. \quad (5b)$$

Figure 7A:
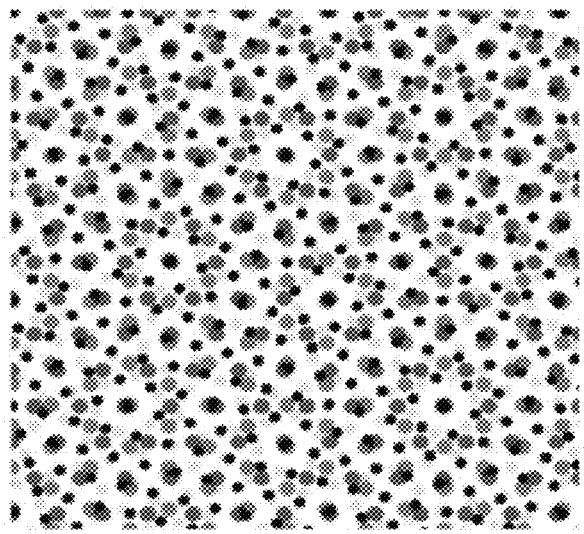
FIGS. 7A and 7B illustrate moiré-free halftone image patterns using four regular hexagonal screens according to an exemplary embodiment of this disclosure.
Figure 7B:
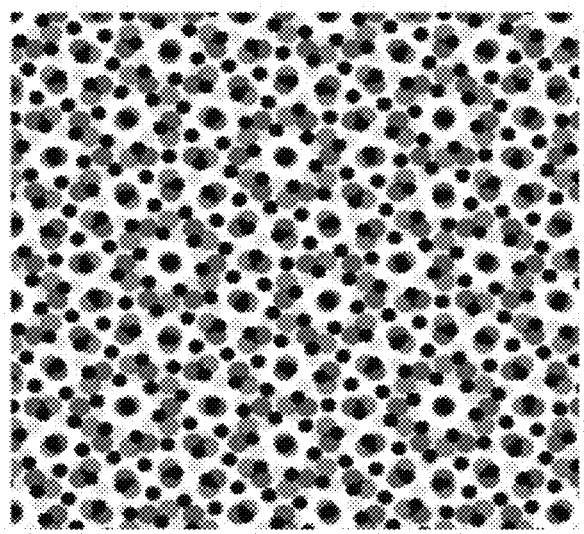

The halftone image patterns of FIG. 7 demonstrate the result of halftoning using the proposed configuration. Two different area coverages are shown. We see that the texture has a pleasing appearance and may have a less noticeable rosette than the image in FIG. 1, prepared using a classical configuration.

In practice, the halftone screens do not need to be perfectly moiré free for acceptable print quality. Some moiré will generally be tolerable if the period is sufficiently long. In printing processes with very low noise, the period may need to be several times the width of the page for an observer to not notice the nonuniformity due to the moiré. For many practical printing processes with noise due to paper structure, marking particles, and system nonuniformities, an observer may not be able to notice moiré periods as short as 5 inches. Moiré periods of that length would allow for slight deviations from the vector equality relationships stated in the present teaching. One impact is that practical pixel frequencies, such as 2,400 or 3,600 dpi (dots per inch), could be used to generate halftones that possess a substantially regular hexagonal geometry.

Described hereto has been a halftoning method and halftoning configuration utilizing three or four regular hexagonal screens, or more precisely, screens with hexagonally tiled clusters for moiré-free color printing. The teaching has been directed to the frequency vector specifications of tiling rather than the cluster shape because various cluster shapes can be employed within the tiling configuration.

According to another aspect of this disclosure, a halftoning method and halftone configuration utilizing three or four rotated convex tessellated convex hexagon screens for moiré-free color printing is disclosed. The configuration has the following properties. Each screen is constructed of convex tessellating hexagons, where a screen can be thought of as having three fundamental frequencies that are similar in vector length. A first set of screens ($S_1$ and $S_2$) possess frequency vectors that are approximately equal in length and are within one frequency range. A second set of screens ($S_3$ and $S_4$) also possess frequency vectors of approximately equal length and can be constructed from sums and differences of frequency vectors from $S_1$ and $S_2$. The frequency vectors of the present invention can be readily achieved with common pixel grids, whereas the idealized hexagons described hereto present a challenge to achieve those vectors with sufficient accuracy to be moiré-free.

6. Non-Orthogonal Clustered-Dot Screens

Most halftone screens used in color reproduction are orthogonal screens. That is, the screens are constructed of rectangular cells, or more likely, square cells. However, for most digital printing devices, the size and shape of halftone cells are constrained by the "digital grid", which defines the locations of printed dots, and therefore, achieving an exact 15° or 75° angle for a fundamental frequency of a clustered dot screen is impossible. Although there are many alternative approaches for moiré-free color halftoning, most of those methods only provide approximate solutions and/or have a tendency to generate additional artifacts in the halftone outputs. The difficulty to achieve moiré-free color halftoning is greatly relieved by using non-orthogonal halftone screens, i.e., screens constructed of general parallelogram tiles, which can include orthogonal tiles. S. Wang, Z. Fan and Z. Wen, "Non-orthogonal halftone screens", *Proc. NIP18: International Conference on Digital Printing Technologies*, pages 578-584 (2002) provides a detailed description of the design procedure for moiré-free halftoning using non-orthogonal clustered screens.

Figure 8:
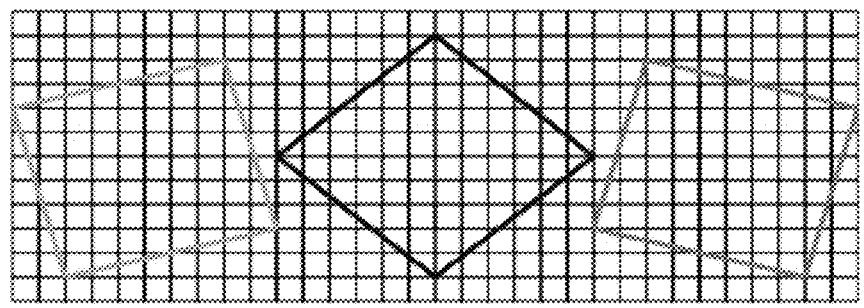
FIG. 8 illustrates halftone cells for three non-orthogonal screens satisfying moiré-free conditions.
Figure 9:
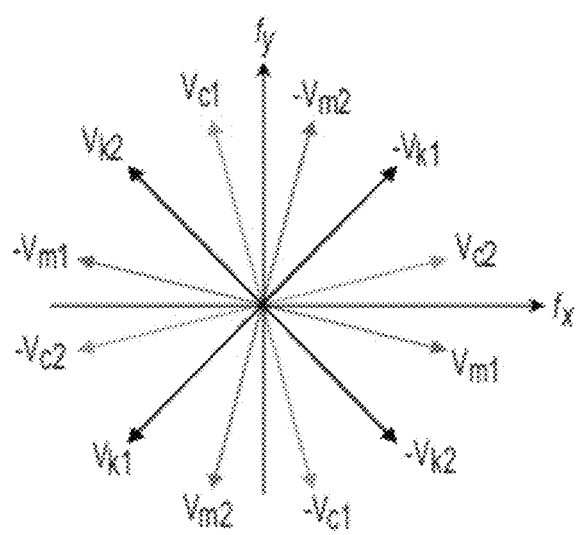
FIG. 9 illustrates frequency vectors for the non-orthogonal screen cells of FIG. 8.
Figure 10:
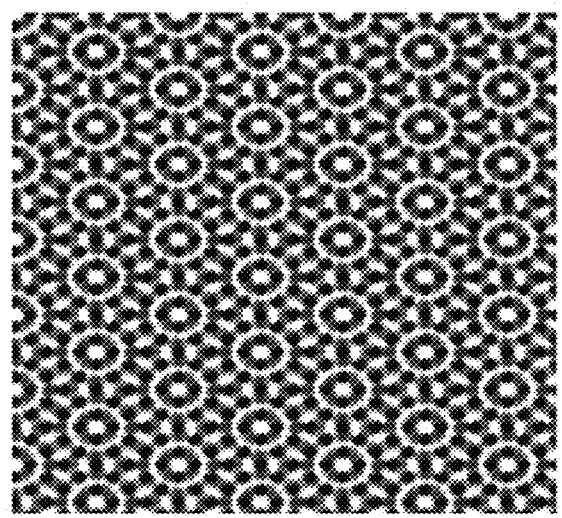
FIG. 10 illustrates halftone rosettes formed from the set of moiré-free non-orthogonal halftone screens illustrated in FIGS. 8 and 9.
Figure 11:
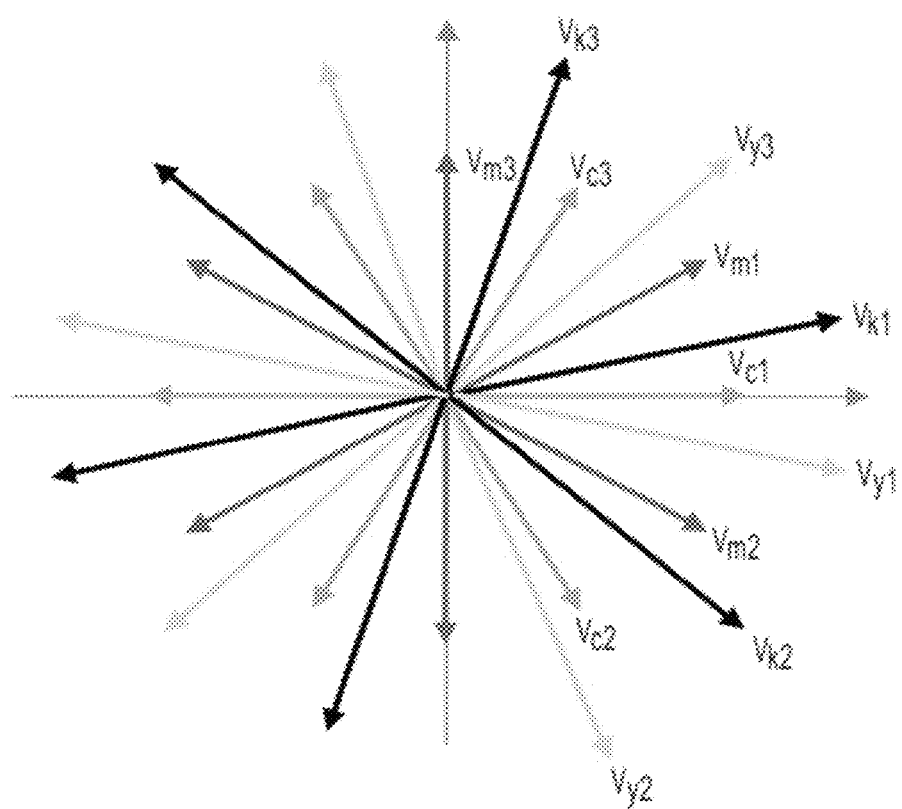
FIG. 11 illustrates a moiré-free color halftone frequency vector configuration using general convex tessellating hexagons according to an exemplary embodiment of this disclosure.
Figure 12A:
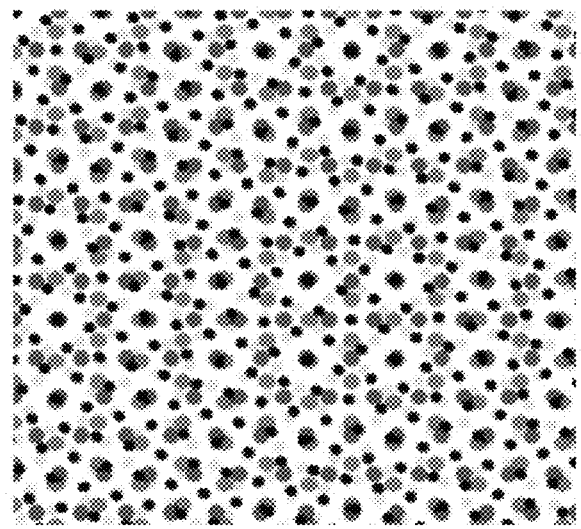
FIGS. 12A and 12B illustrate moiré-free halftone patterns using four screens with general hexagonal tiles according to an exemplary embodiment of this disclosure.
Figure 12B:
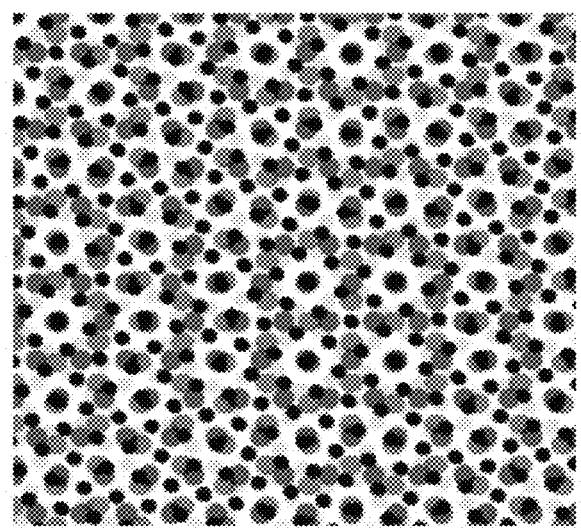

An example of a moiré-free non-orthogonal screen is illustrated in FIGS. 8-10. The three parallelograms in FIG. 8 illustrate the shape and orientation of the halftone cells. The corresponding frequency vectors are shown in FIG. 9. A halftone image resulting from this configuration is shown in FIG. 10.

7. General Solution for Moiré-Free Halftoning Using Four Rotated Tessellated Convex Hexagon Screens In this section, we provide a general solution for moiré-free halftoning using four rotated screens with tessellating convex hexagon cells. The term "tessellating convex hexagon" implies that the shape of each cell is such that it can tessellate to fully tile the image plane and it is a convex hexagon. This implies that the two fundamental frequency vectors, $V_{h1}$ and $V_{h2}$ do not necessarily have the relation as in the regular hexagon cases, i.e., $|V_{h1}|=|V_{h2}|$ and $|A(V_{h1}, V_{h2})|=60°$.

For two fundamental frequency vectors of the C and M screens, $V_{c1}$, $V_{c2}$, $V_{m1}$ and $V_{m2}$, defined by the notation illustrated in FIG. 9 and the third "fundamental" of C and M given by $$V_{c3}=V_{c1}-V_{c2}, \quad (6a)$$

$$V_{m3}=V_{m1}-V_{m2} \quad (6b)$$

The general moiré-free solution can be described by $$V_{k1}=V_{c3}+V_{m2}, \quad (7a)$$

$$V_{k2}=V_{c1}-V_{m3}, \quad (7b)$$

$$V_{y1}=V_{m1}+V_{c2}, \quad (7c)$$

$$V_{y2}=V_{m2}-V_{c3}. \quad (7d)$$

And the third "fundamental" of K and Y are given by $$V_{k3}=V_{k1}-V_{k2}, \quad (8a)$$

$$V_{y3}=V_{y1}-V_{y2}. \quad (8b)$$

For example, if two convex tessellating hexagons are defined for the C and M channels by
$V_{c1}=(160, 0)$, $V_{c2}=(80, -150)$,
$V_{m1}=(150, 80)$, $V_{m2}=(150, -80)$ (in units of cycles/inch), one may use the solution described by Eqs. (6-8) and find the other two screens as
$V_{y1}=(230, -70)$, $V_{y2}=(70, -230)$,
$V_{k1}=(230, 70)$, $V_{k2}=(160, -160)$.

The corresponding third "fundamentals" of the four screens are
$V_{c3}=(80, 150)$,
$V_{m3}=(0, 160)$,
$V_{y3}=(160, 160)$,
$V_{k3}=(70, 230)$.

The use of the combination of above four screens provides a moiré-free halftoning solution and halftone outputs for two gray levels are shown in FIG. 10. It is particularly interesting to notice that all four halftone screens illustrated here can be implemented digitally using single-cell non-orthogonal halftone screens specified by two spatial vectors listed below, respectively, for color printers with a 4800×4800 dpi resolution.
$v_{c1}=(30, 16)$, $v_{c2}=(-30, 16)$,
$v_{m1}=(16, 30)$, $v_{m2}=(-16, 30)$,
$v_{y1}=(23, 7)$, $v_{y2}=(7, 23)$,
$v_{k1}=(23, -7)$, $v_{k2}=(-7, 23)$.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A moiré-free halftone image forming method for reproducing an image using a different halftone screen with hexagonally tiled clusters for each colorant associated with an image rendering device, the method comprising:
   a) defining a first colorant halftone screen with hexagonally tiled clusters having a first fundamental frequency vector $V_{c1}$, a second fundamental frequency vector $V_{c2}$, and a third fundamental frequency vector $V_{c3}$, where $V_{c3}=V_{c1}-V_{c2}$;
   b) defining a second colorant halftone screen with hexagonally tiled clusters having a first fundamental frequency vector $V_{m1}$, a second fundamental frequency vector $V_{m2}$ and a third fundamental frequency vector $V_{m3}$, where $V_{m3}=V_{m1}-V_{m2}$;
   c) defining a third colorant halftone screen with hexagonally tiled clusters having a first fundamental frequency vector $V_{y1}$, a second fundamental frequency $V_{y2}$ and a third fundamental frequency $V_{y3}$, where $V_{y1}=V_{m1}+V_{c2}$, $V_{y2}=V_{m2}-V_{c3}$ and $V_{y3}=V_{y1}-V_{y2}$;
   d) generating the first colorant halftone screen, the second colorant halftone screen and the third colorant halftone screen;
   e) applying the first colorant halftone screen to the image to produce a first colorant halftone output, applying the second colorant halftone screen to the image to produce a second colorant halftone output, and applying the third colorant halftone screen to the image to produce a third colorant halftone output; and
   f) overlaying the first colorant halftone output, the second colorant halftone output and the third colorant halftone output to reproduce the image with a moiré-free halftone image.

2. The method of claim 1, wherein one or more of the defined colorant halftone screens are associated with one of cyan, magenta, yellow, black, red, green, blue, orange, violet, gray, light cyan, light magenta, and dark yellow.

3. The method of claim 1, further comprising:
rendering the image on the image rendering device using the first colorant halftone output, the second colorant halftone output and the third colorant halftone output.

4. The method of claim 1, wherein a pixel grid is associated with the image rendering device and the first, second and third halftone screens include tessellating convex hexagon cells.

5. The method of claim 1, further comprising:
defining a fourth colorant halftone screen with hexagonally tiled clusters having a first fundamental frequency vector $V_{k1}$, a second fundamental frequency vector $V_{k2}$ and a third fundamental frequency vector $V_{k3}$, where $V_{k1}=V_{c3}+V_{m2}$, $V_{k2}=V_{c1}-V_{m3}$, and $V_{k3}=V_{k1}-V_{k2}$;
generating the fourth colorant halftone screen;
applying the fourth colorant halftone screen to the image to produce a fourth colorant halftone output; and
overlaying the first colorant halftone output, the second colorant halftone output, the third colorant halftone output and the fourth colorant halftone output to digitally reproduce the image with a moiré-free halftone image.

6. The method of claim 1, wherein step d) generates a digital representation of the first, second and third color halftone screens.

7. A computer program product comprising:
a non-transitory computer-usable data carrier storing instructions that, when executed by a computer, cause the computer to perform a moiré-free halftone image forming method for reproducing an image using a different halftone screen with hexagonally tiled clusters for each colorant associated with an image rendering device, the method comprising:
a) defining a first colorant halftone screen with hexagonally tiled clusters having a first fundamental frequency vector $V_{c1}$, a second fundamental frequency vector $V_{c2}$, and a third fundamental frequency vector $V_{c3}$, where $V_{c3}=V_{c1}-V_{c2}$;
b) defining a second colorant halftone screen with hexagonally tiled clusters having a first fundamental frequency vector $V_{m1}$, a second fundamental frequency vector $V_{m2}$ and a third fundamental frequency vector $V_{m3}$, where $V_{m3}=V_{m1}-V_{m2}$;
c) defining a third colorant halftone screen with hexagonally tiled clusters having a first fundamental frequency vector $V_{y1}$, a second fundamental frequency $V_{y2}$ and a third fundamental frequency $V_{y3}$, where $V_{y1}=V_{m1}+V_{c2}$, $V_{y2}=V_{m2}-V_{c3}$ and $V_{y3}=V_{y1}-V_{y2}$;
d) generating the first colorant halftone screen, the second colorant halftone screen and the third colorant halftone screen; and
e) applying the first colorant halftone screen to the image to produce a first colorant halftone output, applying the second colorant halftone screen to the image to produce a second colorant halftone output, and applying the third colorant halftone screen to the image to produce a third colorant halftone output; and
f) overlaying the first colorant halftone output, the second colorant halftone output and the third colorant halftone output to reproduce the image with a moiré-free halftone image.

8. The computer program product according to claim 7, wherein one or more of the defined colorant halftone screens are associated with one of cyan, magenta, yellow, black, red, green, blue, orange, violet, gray, light cyan, light magenta, and dark yellow.

9. The computer program product according to claim 7, the method further comprising:
rendering the image on the image rendering device using the first colorant halftone output, the second colorant halftone output and the third colorant halftone output.

10. The computer program product according to claim 7, wherein a pixel grid is associated with the image rendering device and the first, second and third halftone screens include tessellating convex hexagon cells.

11. The computer program product according to claim 7, the method further comprising:
defining a fourth colorant halftone screen with hexagonally tiled clusters having a first fundamental frequency vector $V_{k1}$, a second fundamental frequency vector $V_{k2}$ and a third fundamental frequency vector $V_{k3}$, where $V_{k1}=V_{c3}+V_{m2}$, $V_{k2}=V_{c1}-V_{m3}$, and $V_{k3}=V_{k1}-V_{k2}$;
generating the fourth colorant halftone screen;
applying the fourth colorant halftone screen to the image to produce a fourth colorant halftone output; and
overlaying the first colorant halftone output, the second colorant halftone output, the third colorant halftone output and the fourth colorant halftone output to digitally reproduce the image with a moiré-free halftone image.

12. The computer program product according to claim 7, wherein step d) generates a digital representation of the first, second and third color halftone screens.

13. A printing apparatus comprising:
an image marking device for rendering a color image on a media substrate; and
a controller configured to receive a representation of an image for rendering on the image marking device, the controller configured to execute instructions to perform a moiré-free halftone image forming method for reproducing an image using a different halftone screen with hexagonally tiled clusters for each colorant associated with the image marking device, the method comprising:
a) defining a first colorant halftone screen with hexagonally tiled clusters having a first fundamental frequency vector $V_{c1}$, a second fundamental frequency vector $V_{c2}$, and a third fundamental frequency vector $V_{c3}$, where $V_{c3}=V_{c1}-V_{c2}$;
b) defining a second colorant halftone screen with hexagonally tiled clusters having a first fundamental frequency vector $V_{m1}$, a second fundamental frequency vector $V_{m2}$ and a third fundamental frequency vector $V_{m3}$, where $V_{m3}=V_{m1}-V_{m2}$;
c) defining a third colorant halftone screen with hexagonally tiled clusters having a first fundamental frequency vector $V_{y1}$, a second fundamental frequency $V_{y2}$ and a third fundamental frequency $V_{y3}$, where $V_{y1}=V_{m1}+V_{c2}$, $V_{y2}=V_{m2}-V_{c3}$ and $V_{y3}=V_{y1}-V_{y2}$;
d) generating the first colorant halftone screen, the second colorant halftone screen and the third colorant halftone screen;
e) applying the first colorant halftone screen to the image to produce a first colorant halftone output, applying the second colorant halftone screen to the image to produce a second colorant halftone output, and applying the third colorant halftone screen to the image to produce a third colorant halftone output; and
f) overlaying the first colorant halftone output and the second colorant halftone output, and the third colorant halftone output to reproduce the image with a moiré-free halftone image.

14. The printing apparatus according to claim 13, wherein one or more of the defined colorant halftone screens are associated with one of cyan, magenta, yellow, black, red, green, blue, orange, violet, gray, light cyan, light magenta, and dark yellow.

15. The printing apparatus according to claim 13, the method further comprising:

rendering the image on the image rendering device using the first colorant halftone output, the second colorant halftone output and the third colorant halftone output.

16. The printing apparatus according to claim 13, wherein a pixel grid is associated with the image rendering device and the first, second and third halftone screens include tessellating convex hexagon cells.

17. The printing apparatus according to claim 13, the method further comprising:

defining a fourth colorant halftone screen with hexagonally tiled clusters having a first fundamental frequency vector $V_{k1}$, a second fundamental frequency vector $V_{k2}$ and a third fundamental frequency vector $V_{k3}$, where $V_{k1}=V_{c3}+V_{m2}$, $V_{k2}=V_{c1}-V_{m3}$, and $V_{k3}=V_{k1}-V_{k2}$;

generating the fourth colorant halftone screen;

applying the fourth colorant halftone screen to the image to produce a fourth colorant halftone output; and overlaying the first colorant halftone output, the second colorant halftone output, the third colorant halftone output and the fourth colorant halftone output to digitally reproduce the image with a moiré-free halftone image.

18. The printing apparatus according to claim 13, wherein step d) generates a digital representation of the first, second and third color halftone screens.

* * * * *